United States Patent
Wang et al.

(10) Patent No.: US 11,176,687 B2
(45) Date of Patent: Nov. 16, 2021

(54) METHOD AND APPARATUS FOR DETECTING MOVING TARGET, AND ELECTRONIC EQUIPMENT

(71) Applicant: Beijing Dajia Internet Information Technology Co., Ltd., Haidian District (CN)

(72) Inventors: Zairan Wang, Haidian District (CN); Xiaoyan Guo, Haidian District (CN); Wen Zheng, Haidian District (CN)

(73) Assignee: BEIJING DAJIA INTERNET INFORMATION TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/138,452

(22) Filed: Dec. 30, 2020

(65) Prior Publication Data

US 2021/0118152 A1 Apr. 22, 2021

Related U.S. Application Data

(63) Continuation of application No. PCT/CN2020/073327, filed on Jan. 20, 2020.

(30) Foreign Application Priority Data

Jan. 31, 2019 (CN) .......................... 201910101425.4

(51) Int. Cl.
*G06K 9/46* (2006.01)
*G06T 7/246* (2017.01)

(52) U.S. Cl.
CPC ............. *G06T 7/246* (2017.01); *G06K 9/46* (2013.01)

(58) Field of Classification Search
CPC . G06T 2207/10016; G06T 7/20; G06T 7/579; G06T 2207/30241; G06T 7/246;
(Continued)

(56) References Cited

U.S. PATENT DOCUMENTS 10,832,428 B2 * 11/2020 Plowman ................... G06T 7/80
2004/0101161 A1 * 5/2004 Roh .................... G06K 9/00805
382/103
(Continued)

FOREIGN PATENT DOCUMENTS

CN 102243764 11/2011
CN 103745474 4/2014
(Continued)

OTHER PUBLICATIONS

International Searching Authority, "Written Opinion," issued in connection with International Patent Application No. PCT/CN2020/073327, dated Apr. 20, 2020, 4 pages.
(Continued)

*Primary Examiner* — Ian L Lemieux
(74) *Attorney, Agent, or Firm* — Hanley, Flight & Zimmerman, LLC

(57) ABSTRACT

A method and apparatus for detecting a moving target, an electronic equipment and a storage medium. The method includes obtaining a first frame image and a second frame image which are adjacent, and a rotation matrix and a translation matrix between the first and second frame images, the first and second frame image include the same moving target; extracting first feature points from the first frame image; determining second feature points corresponding to the first feature points from the second frame image based on the second frame image and the first feature points; determining distances between the second feature points and corresponding polar lines based on the rotation matrix and the translation matrix; determining third feature points located on the moving target based on the distances; and detecting the moving target based on the third feature points.

15 Claims, 5 Drawing Sheets

(58) Field of Classification Search
CPC .... G06T 7/73; G06T 7/97; G06T 5/50; G06T 7/285; G06T 15/10; G06T 5/006; G01B 11/2545; G01B 2210/52
See application file for complete search history.

(56) References Cited

U.S. PATENT DOCUMENTS

| 2007/0185946 | A1* | 8/2007 | Basri | G06T 7/593 |
| | | | | 708/200 |
| 2008/0137940 | A1 | 6/2008 | Kakinami et al. | |
| 2017/0140231 | A1* | 5/2017 | Chen | G06K 9/623 |
| 2017/0178345 | A1* | 6/2017 | Pham | G06T 7/277 |

FOREIGN PATENT DOCUMENTS

| CN | 103810718 | 5/2014 |
| CN | 104197928 | 12/2014 |
| CN | 104240267 | 12/2014 |
| CN | 104428624 | 3/2015 |
| CN | 106504265 | 3/2017 |
| CN | 109902725 | 6/2019 |

OTHER PUBLICATIONS

China Intellectual Property Adminstration, "Office Action," issued in connection with Chinese Patent Application No. 201910101425.4, dated Sep. 7, 2020, 9 pages.
International Searching Authority, "Search Report," issued in connection with International Patent Application No. PCT/CN2020/073327, dated Apr. 18, 2020, 4 pages.
Yuxin et al., "Detection of moving objects in dynamic scenes based on epipolar geometry constraint," Application Research of Computers, vol. 35, No. 11, Nov. 2018, 4 pages.
Ke, "Moving Object Detection and Tracking in Dynamic Scenes," Central South University, [http;//www.ixueshu.com], May 20, 2011, 78 pages.
Feifei, "Research on object recognition and tracking based on the improved SIFT," Bejing Institute of Technology, [http;//www.ixueshu.com], Jan. 2015, 83 pages.
CSDN,"FAST", [www.CSDN.net], Mar. 2018, 2 pages.
CSDN,"FAST", [www.CSDN.net], Jul. 2015, 2 pages.
CSDN, "Epipolar geometric constraints, basic matrix solving, and polar line," Feb. 25, 2016, 7 pages, English abstract provided.
CSDN, "Three-dimensional reconstruction (1) Outer pole geometry, basic matrix and solution," Jul. 5, 2016, 3 pages, English abstract provided.
Di, Xiao-Guang et al., "Moving object detection in non-planar scenes based on improved gradient suppression," Systems Engineering and Electronics, vol. 36, No. 6, Jun. 2014, 7 pages, English abstract provided.

* cited by examiner

METHOD AND APPARATUS FOR DETECTING MOVING TARGET, AND ELECTRONIC EQUIPMENT

CROSS REFERENCE TO RELATED APPLICATIONS

This application is a continuation of International Application No. PCT/CN2020/073327, filed Jan. 20, 2020, which claims priority under 35 U.S.C. 119 to the Chinese Patent Application No. 201910101425.4, filed on Jan. 31, 2019, in the China National Intellectual Property Administration, and entitled "METHOD AND APPARATUS FOR DETECTING MOVING TARGET, ELECTRONIC EQUIPMENT AND STORAGE MEDIUM". The entire disclosure of above application is incorporated herein by reference.

FIELD

The disclosure relates to the field of image processing, and particularly relates to a detection method and apparatus for a moving target, electronic equipment and a storage medium.

BACKGROUND

The shooting of a moving object is a common shooting scene, such as the shooting of athletes' postures in fierce sport competitions, and recording of the real scene of animal running in animal photography. The shooting of people or things moving at a high speed requires professional shooting skills and rich experience, but many users usually do not have professional shooting knowledge, so the shooting works are not satisfactory.

SUMMARY

According to a first aspect of embodiments of the disclosure, a method for detecting a moving target is provided, which includes following:
obtaining a first frame image and a second frame image, and a rotation matrix and a translation matrix, wherein the first frame image and the second frame image are adjacent; the rotation matrix and the translation matrix are between the first frame image and the second frame image, the first frame image and the second frame image both comprise a same moving target;
extracting a plurality of first feature points from the first frame image;
determining a plurality of second feature points from the second frame image based on the second frame image and the first feature points, wherein the second features points correspond to the first feature points;
determining a plurality of distances between the second feature points and a plurality of polar lines based on the rotation matrix and the translation matrix, wherein the polar lines correspond to the second feature points, and the polar lines correspond to the first feature points on the second frame image;
determining a plurality of third feature points located on the moving target based on the distances; and
detecting the moving target based on the third feature points.
According to a second aspect of the embodiments of the disclosure, electronic equipment is provided, which includes:
a processor; and
a memory for storing computer readable instructions;
wherein the processor is configured to execute the computer readable instructions to implement followings:
obtaining a first frame image and a second frame image, and a rotation matrix and a translation matrix, wherein the first frame image and the second frame image are adjacent; the rotation matrix and the translation matrix are between the first frame image and the second frame image, the first frame image and the second frame image both comprise a same moving target;
extracting a plurality of first feature points from the first frame image;
determining a plurality of second feature points from the second frame image based on the second frame image and the first feature points, wherein the second features points correspond to the first feature points;
determining a plurality of distances between the second feature points and a plurality of polar lines based on the rotation matrix and the translation matrix, wherein the polar lines correspond to the second feature points, and the polar lines correspond to the first feature points on the second frame image;
determining a plurality of third feature points located on the moving target based on the distances; and
detecting the moving target based on the third feature points.
According to a third aspect of the embodiments of the disclosure, a non-temporary computer-readable storage medium is provided, which includes instructions, wherein in response to that the instructions are executed by a processor of a mobile terminal, the mobile terminal performs a process of:
obtaining a first frame image and a second frame image, and a rotation matrix and a translation matrix, wherein the first frame image and the second frame image are adjacent; the rotation matrix and the translation matrix are between the first frame image and the second frame image, the first frame image and the second frame image both comprise a same moving target;
extracting a plurality of first feature points from the first frame image;
determining a plurality of second feature points from the second frame image based on the second frame image and the first feature points, wherein the second features points correspond to the first feature points;
determining a plurality of distances between the second feature points and a plurality of polar lines based on the rotation matrix and the translation matrix, wherein the polar lines correspond to the second feature points, and the polar lines correspond to the first feature points on the second frame image;
determining a plurality of third feature points located on the moving target based on the distances; and
detecting the moving target based on the third feature points.

BRIEF DESCRIPTION OF THE DRAWINGS

The accompanying drawings herein, which are incorporated in the specification and constitute a part of this specification, illustrate embodiments consistent with the disclosure and, together with the specification, serve to explain the principles of the disclosure.

DETAILED DESCRIPTION OF THE EMBODIMENTS

Exemplary embodiments will be described in detail herein, examples of which are shown in the accompanying drawings. When the following description relates to the accompanying drawings, the same numbers in different accompanying drawings refer to same or similar elements unless otherwise indicated. The implementation modes described in the following exemplary embodiments are not representative of all embodiments consistent with the disclosure. Rather, they are merely examples of methods and apparatuses consistent with some aspects of the disclosure as detailed in the appended claims.

Figure 1:
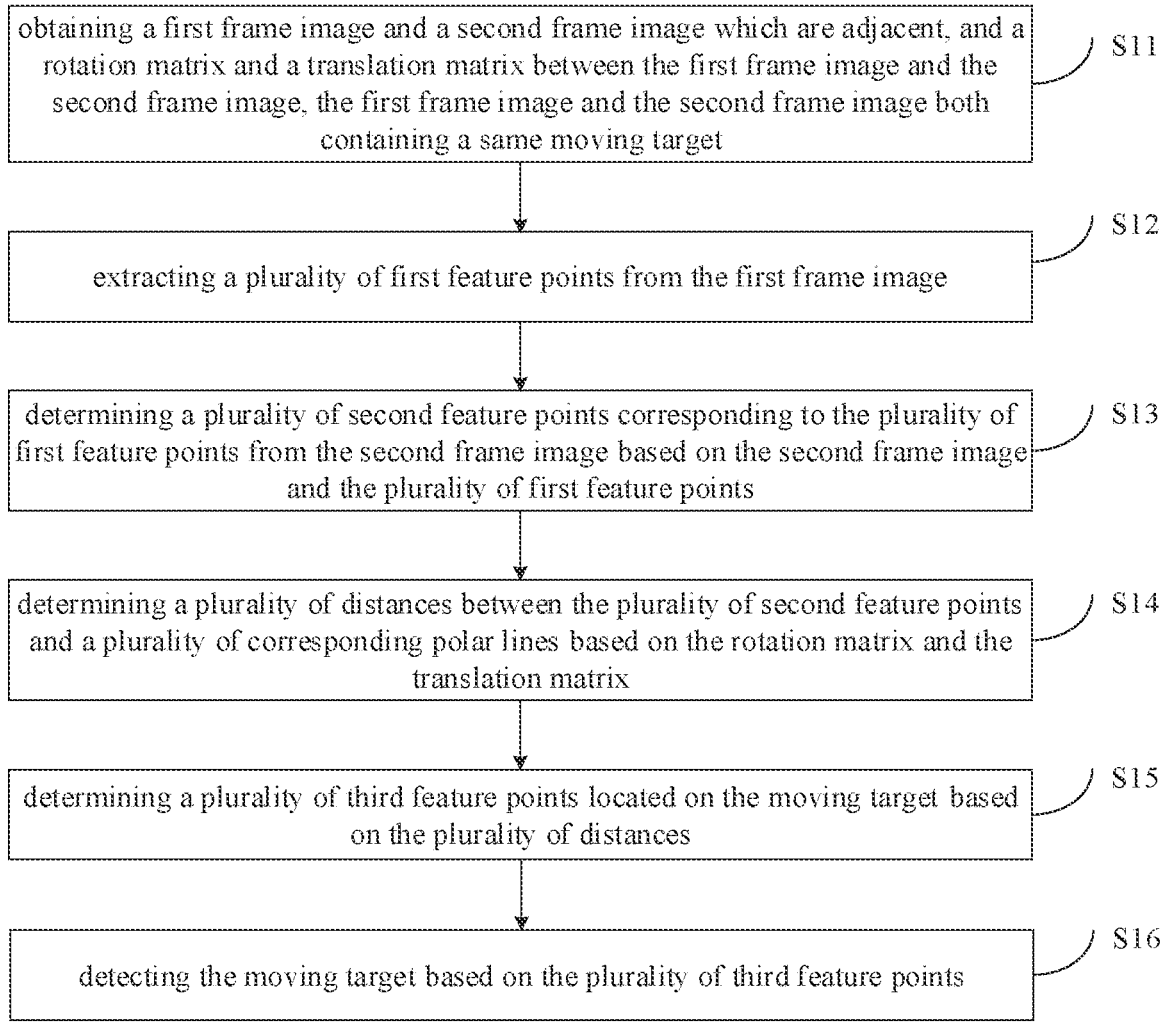
FIG. 1 is a schematic flow diagram of a detection method for a moving target according to an embodiment of the disclosure.

FIG. 1 illustrates a method for a detecting moving target according to an embodiment of the disclosure.

As shown in FIG. 1, the method for detecting a moving target in some embodiments is applied to a mobile terminal, and the method may include the following steps.

S11, obtaining a first frame image and a second frame image which are adjacent, and a rotation matrix and a translation matrix between the first frame image and the second frame image, the first frame image and the second frame image both include a same moving target.

Images in some embodiments of the disclosure can be shot by an image obtaining device such as a camera or a video camera. In some embodiments, the image can be obtained by a Complementary Metal-Oxide-Semiconductor (CMOS) sensor in the image obtaining device. The first frame image and the second frame image can be shot at the same position by the image obtaining device such as a camera or a video camera, or can be shot at different positions by the image obtaining device such as a camera or a video camera. Embodiments of the disclosure do not specifically limit the shooting position of the first frame image and the second frame image, nor specifically limit the basic information such as the resolution, format, capacity, etc., of the first frame image and the second frame image.

After the first frame image and the second frame image are obtained, the rotation matrix and the translation matrix between the first frame image and the second frame image can be obtained based on an International Mathematical Union (IMU) sensor. The IMU is a device that measures a three-axis attitude angle (or an angular rate) and acceleration of an object. In practical application, the IMU can obtain the rotation matrix and the translation matrix based on the attitude relationship between the first frame image and the second frame image.

Before the attitude relationship is introduced, the epipolar geometry principle needs to be introduced. Epipolar geometry is the basis of view geometry theory. Epipolar geometry describes the visual geometric relationship between two frame images in the same scene. Epipolar geometry only depends on parameters in the camera and the relative posture between the two frame images.

Figure 2:
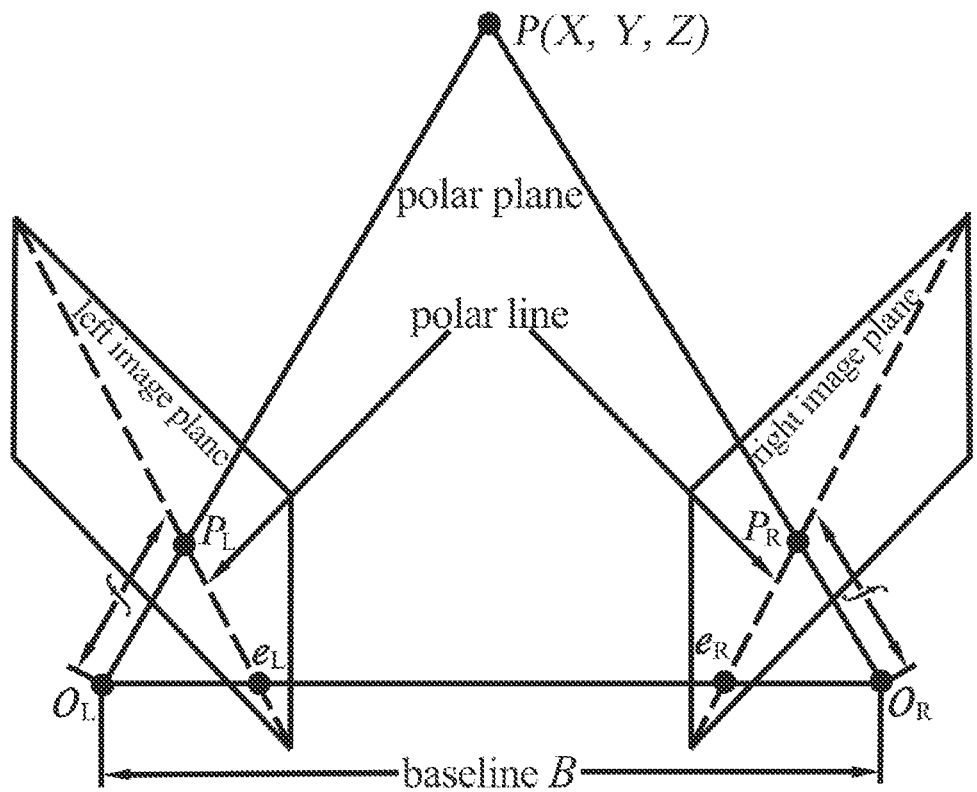
FIG. 2 is a schematic diagram of an epipolar geometry principle according to an embodiment of the disclosure.

As shown in FIG. 2, a point P (X, Y, Z) in a three-dimensional space is projected to a left image plane IL and a right image plane IR, projection points are PL and PR respectively, and points OL and OR are camera centers of the two planes IL and IR respectively. The points OL, OR and P form a polar plane in the three-dimensional space. An intersection line PLeL between the polar plane and the left image plane IL is called a polar line corresponding to the projection point PR. Similarly, an intersection line PReR between the polar plane and the right image plane IR is called a polar line corresponding to the projection point PL. A line segment between the points OL and OR is called a baseline B, and a distance from each camera center to the corresponding polar line is f.

The IMU can obtain the attitude relationship based on built-in accelerometer (three axes), gyroscope (three axes) and magnetic field meter (three axes), such as using a nine-axis fusion algorithm to obtain the attitude relationship. The accelerometer is used to detect the gravity acceleration of the moving target on the three axes, the gyroscope is used to measure the rotation rate of the moving target on the three axes, and the magnetic field meter can be a compass, which can correct the yaw of data in six axes of the three axes of the accelerometer and the three axes of the gyroscope. The gravity acceleration obtained by the accelerometer can determine a placement state of the moving target, and the rotation rate measured by the gyroscope can be used to detect an instantaneous state of the moving target, such as the speed of overturning and rotation, etc. Through the integration operation of the accelerometer and the gyroscope, a motion state of the moving target can be obtained. There is a slight difference between the integration operation and a real state, which has little influence in a short period of time, but this difference will be accumulated all the time. As the use time increases, there will be an obvious deviation. Therefore, it is necessary to introduce a magnetic field meter to find a correct direction for correction. Common nine-axis fusion algorithms can include Kalman filter, particle filter, complementary filter algorithm, etc.

The attitude relationship between the first frame image and the second frame image can include the following two types: a first attitude relationship, in which a straight line on the other frame image can be determined by a point on one frame image via epipolar geometry; a second attitude relationship, through a mapping relation between a point and a straight line in the first attitude relationship, a point on the other frame image can be determined based a point on one frame image, and the point on the other frame image can be an image of an intersection point of a ray of the first frame image and a plane on the second frame image. The ray passes through the optical center and the image point.

The first attitude relationship can be expressed by a basic matrix, and the second attitude relationship can be expressed by a homography matrix. An essential matrix is a special case of the basic matrix, which belongs to a basic matrix under a normalized image coordinate. The essential matrix uses a camera coordinate system, and the essential matrix is $E = \hat{t} R$, wherein t is a translation matrix, R is a rotation matrix, and $\hat{\ }$ is an antisymmetric sign which is used to convert the translation matrix t into an antisymmetric form. The essential matrix is a 3×3 matrix with 5 degrees of freedom, namely, 3 degrees of freedom contained in the translation matrix and 3 degrees of freedom contained in the rotation matrix, and 1 degree of freedom of scale uncertainty removed (the essential matrix is a homogeneous quantity). One of the functions of the essential matrix is to multiply a point given on a frame of image with the essential matrix, and the result is the polar line of this point on the other frame image, and in matching, the search range can be greatly narrowed. Another function of the essential matrix is to calculate the rotation matrix R and translation matrix t.

In some embodiments of the disclosure, since there may be moving or mismatched feature points in the first feature points and the second feature points, in order to improve robustness, the IMU may use a random sampling consistency algorithm to determine the rotation matrix and the translation matrix.

It should be noted that the first frame image and the second frame image may be two adjacent frame images both including the same moving target, wherein the moving target may be a human being, an animal, and other objects, etc., and the other objects may include but are not limited to plants, vehicles, and any object that can actively move or can be passively moved.

S12, extracting a plurality of first feature points from the first frame image.

In some embodiments, a FAST feature point detection algorithm can be used to extract a plurality of first feature points from the first frame image. The FAST feature point detection algorithm belongs to a feature point detection algorithm. The detection principle is: if a certain number of pixel points around one pixel point are different from of the pixel point in terms of a pixel value, the one pixel point is considered as a angular point, i.e., an extreme point. For example, with a pixel point p on the first frame image as the center, there are 16 pixel points on a circle with a radius of 3 pixel points, namely p1, p2, . . . p16 respectively. The pixel value differences between the pixel points p1 and p9 and the center p are calculated, and if their absolute values are less than a preset pixel threshold, the point p cannot be a first feature point, otherwise, the point p is determined as a candidate first feature point. If the point p is the candidate first feature point, the pixel value differences between the pixel points p1, p9, p5 and p13 and the center p are calculated, and if at least three of their absolute values exceed a pixel threshold, the point p is determined as the candidate first feature point, otherwise, the point p cannot be the first feature point. If the point p is the candidate first feature point, the pixel value differences between the 16 pixel points p1 to p16 and the center p are calculated, and if at least 9 of their absolute values exceed the pixel threshold, the point p is the first feature point, otherwise, the point p cannot be the first feature point.

In some embodiments of the disclosure, in order to prevent the plurality of first feature points extracted from the first frame image from being concentrated in a small area, the plurality of first feature points may be uniformly extracted from the first frame image in a non-maximum suppression manner. Non-maximum suppression is to calculate a Euclidean distance between two adjacent first feature points to ensure that the Euclidean distance is greater than a set distance threshold. The embodiments of the disclosure do not specifically limit the values and circuitries of the above pixel threshold and distance threshold.

S13, determining a plurality of second feature points corresponding to the plurality of first feature points from the second frame image based on the second frame image and the plurality of first feature points.

In some embodiments, an optical flow algorithm can be used to obtain a plurality of second feature points corresponding to the plurality of first feature points from the second frame image. The optical flow is a coordinate displacement amount of each pixel point on the image, for example, a position coordinate of a point A on a tth frame image is (x1, y1), and a position coordinate of the point A on the (t+1) th frame image is (x2, y2), wherein x1 is not equal to x2, and/or y1 is not equal to y2. The point A can be determined as the moving point.

The optical flow can be understood as the instantaneous speed of pixel movement of a spatial moving object on an observation imaging plane. In generally, the optical flow is generated by the movement of a target itself, the movement of the camera, or the joint movement of the target and the camera in the scene. The optical flow algorithm can be a method to find the corresponding relationship between the previous frame image and the current frame image by using the change of pixels in an image sequence in a time domain and the correlation between adjacent frames, thus calculating the object motion information between the adjacent frame images.

In some embodiments of the disclosure, before the plurality of second feature points are determined by using the optical flow algorithm, the first frame image and the second frame image can be subjected to local contrast normalization processing which can ensure that the contrast of the first frame image and the second frame image is normalized on each small window instead of being normalized as a whole. The local contrast normalization processing can change the first frame image and the second frame image more and discard image areas with the same intensity in order to obtain robust images under different illumination conditions.

S14, determining a plurality of distances between the plurality of second feature points and a plurality of corresponding polar lines based on the rotation matrix and the translation matrix.

In S14, the distances between the second feature points and the corresponding polar lines are calculated based on the rotation matrix and translation matrix. The polar lines of the first feature points on the second frame image are determined based on the epipolar geometry principle shown in FIG. 2, and then the distances between the second feature points and the corresponding polar lines are calculated based on coordinate values of the second feature points and the polar lines of the first feature points on the second frame image in the normalized camera coordinate system. Embodiments of the disclosure do not specifically limit the technical means used to calculate the distances between the second feature points and the corresponding polar lines.

S15, determining a plurality of third feature points located on the moving target based on the plurality of distances.

According to the epipolar geometry principle, the distance from a non-moving feature point located in a background area in the image to a corresponding polar line is 0, a moving feature point located in a target object area in the image deviates from a corresponding polar line, so that the second feature points located on the moving target and the second feature points located in the background area can be separated based on the distances from the second feature points to the corresponding polar lines.

In some embodiments, the distances from the second feature points to the corresponding polar lines can be compared with a preset distance threshold, and if the distances from the second feature points to the corresponding polar lines are greater than the distance threshold, the second feature points are determined as the third feature points located on the moving target. If the distances from the second feature points to the corresponding polar lines are less than or equal to the distance threshold, the second feature points are determined as the second feature points located on the background area.

S16, detecting the moving target based on the plurality of third feature points.

After a plurality of third feature points are determined, a minimum bounding rectangle including the plurality of third feature points is determined as an area to which the moving target belongs.

The method for detecting the moving target provided by some embodiments of the disclosure integrates the CMOS and IMU sensors. The first frame image and second frame image which are adjacent can be obtained based on the CMOS, and the rotation matrix and translation matrix between the first frame image and the second frame image can be obtained based on the IMU, wherein the first frame images and the second frame images both include the same moving target. A plurality of first feature points are extracted from the first frame image, and a plurality of second feature points corresponding to the plurality of first feature points are determined in the second frame image. A plurality of distances between the plurality of second feature points and a plurality of corresponding polar lines are calculated based on the rotation matrix and the translation matrix, and then a plurality of third feature points located on the moving target are determined based on the plurality of calculated distances, so as to detect the moving target based on the plurality of third feature points.

According to some embodiments of the disclosure, the first feature points and the second feature points are determined based on two adjacent frame images, the rotation matrix and the translation matrix between the first frame image and the second frame image are obtained, the distances between the second feature points and the corresponding polar lines are calculated through the rotation matrix and the translation matrix, and the third feature points used for detecting the moving target are determined based on the distances. On one hand, embodiments of the disclosure do not specifically limit whether the first frame image and the second frame image are shot at different positions, thus reducing the requirements for the first frame image and the second frame image. On the other hand, embodiments of the disclosure do not need to perform relevant calculation on each pixel point of the first frame image and the second frame image, but only need to extract the first feature points and the second feature points, thus reducing the amount of data calculation. In another aspect, embodiments of the disclosure do not need to create relevant models, thus reducing the detection steps for the moving target.

Figure 3:
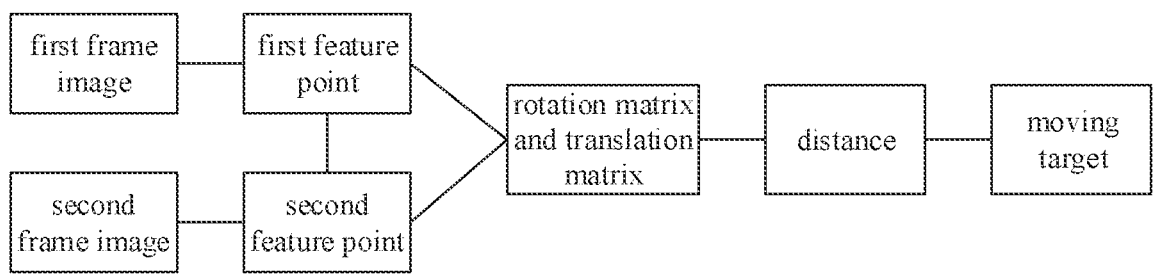
FIG. 3 is a schematic diagram of a process for detecting moving target according to an embodiment of the disclosure.

The technical solution in embodiments of the disclosure can be applied to a moving target detection process shown in FIG. 3. The first feature points can be extracted from the first frame image, the first feature points can be FAST feature points, and then the second feature points corresponding to the first feature points can be extracted from the second frame image. Then, camera motion parameters, i.e., the rotation matrix and the translation matrix, are calculated based on the first feature points and the second feature points. The distances between the second feature points and the corresponding polar lines are calculated based on the rotation matrix and the translation matrix, and finally the moving target is separated based on the calculated distances. The optical flow principle and the epipolar geometry principle are adopted to detect the moving target in the image. Under the application scene of shooting the moving target, the moving target can be automatically focused efficiently, and the accurate and clear moving target can be shot conveniently and quickly.

Figure 4:
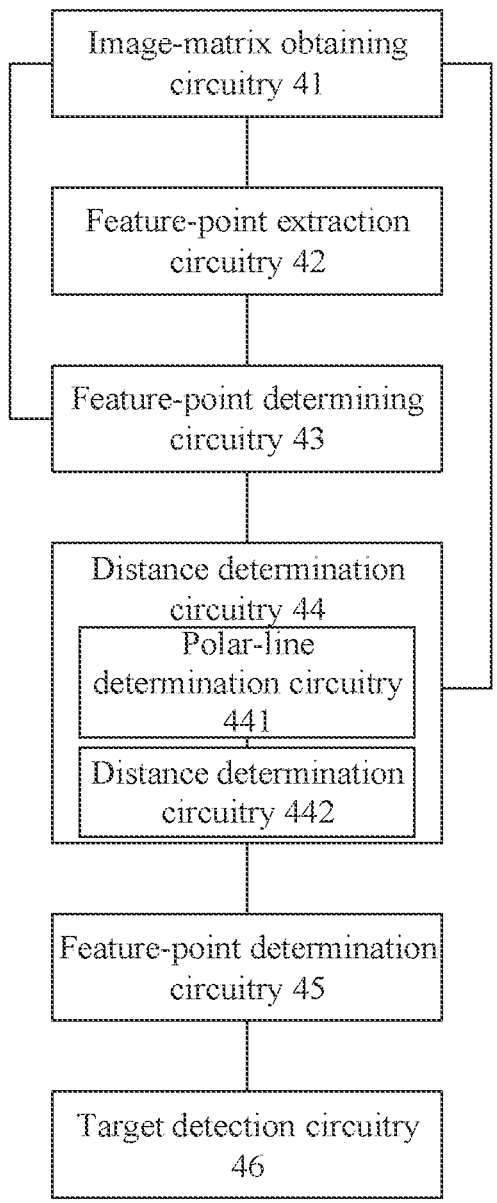
FIG. 4 is a block diagram of an apparatus for a moving target according to an embodiment of the disclosure.

FIG. 4 illustrates an apparatus for detecting a moving target according to an embodiment of the disclosure. As shown in FIG. 4, the apparatus for detecting the moving target provided by an embodiment of the disclosure includes an image-matrix obtaining circuitry 41, a feature-point extraction circuitry 42, a feature-point determination circuitry 43, a distance determination circuitry 44, a feature-point determination circuitry 45, and a target detection circuitry 46. The image-matrix obtaining circuitry 41 is connected and/or communicates with the feature-point extraction circuitry 42, the feature-point determination circuitry 43 and the distance determination circuitry 44, respectively, the feature-point determination circuitry 43 is connected and/or communicates with the feature-point extraction circuitry 42 and the distance determination circuitry 44, respectively, and the feature-point determination circuitry 45 is connected and/or communicates with the distance determination circuitry 44 and the target detection circuitry 46, respectively.

The image-matrix obtaining circuitry 41 is configured to obtain a first frame image and a second frame image which are adjacent, and a rotation matrix and a translation matrix between the first frame image and the second frame image, the first frame image and the second frame image both including a same moving target.

The feature-point extraction circuitry 42 is configured to extract a plurality of first feature points from the first frame image.

The feature-point determination circuitry 43 is configured to determine a plurality of second feature points corresponding to the plurality of first feature points from the second frame image based on the second frame image and the plurality of first feature points.

The distance determination circuitry 44 is configured to determine a plurality of distances between the plurality of second feature points and a plurality of corresponding polar lines based on the rotation matrix and the translation matrix, the plurality of corresponding polar lines being a plurality of polar lines of the plurality of first feature points on the second frame image.

The feature-point determination circuitry 45 is configured to determine a plurality of third feature points located on the moving target based on the plurality of distances.

The target detection circuitry 46 is configured to detect the moving target based on the plurality of third feature points.

The distance determination circuitry 44 includes:
a polar-line determination circuitry 441 which is configured to determine a plurality of polar lines corresponding to the plurality of first feature points on the second frame image based on the rotation matrix and the translation matrix; and
a distance determination circuitry 442 which is configured to determine a plurality of distances between the plurality of second feature points and the plurality of corresponding polar lines based on coordinate values of the plurality of second feature points and the plurality of corresponding polar lines in a normalized camera coordinate system.

In some embodiments, the feature-point determination circuitry 45 is configured to compare the plurality of distances with a preset distance threshold, respectively; and determine the second feature points corresponding to the distances greater than the distance threshold among the plurality of distances as the plurality of third feature points located on the moving target.

In some embodiments, the target detection circuitry 46 is configured to determine a minimum bounding rectangle formed by the plurality of third feature points as an area to which the moving target belongs.

In some embodiments, the feature-point extraction circuitry 42 is configured to extract the plurality of first feature points from the first frame image based on a FAST feature point detection algorithm.

In some embodiments, the feature-point determination circuitry 43 is configured to extract the plurality of second feature points corresponding to the plurality of first feature points from the second frame image based on an optical flow algorithm.

With regard to the apparatus in the above embodiments, the specific operation manner of each circuitry and component has been described in detail in embodiments related to the method, and will not be described in detail here.

Figure 5:
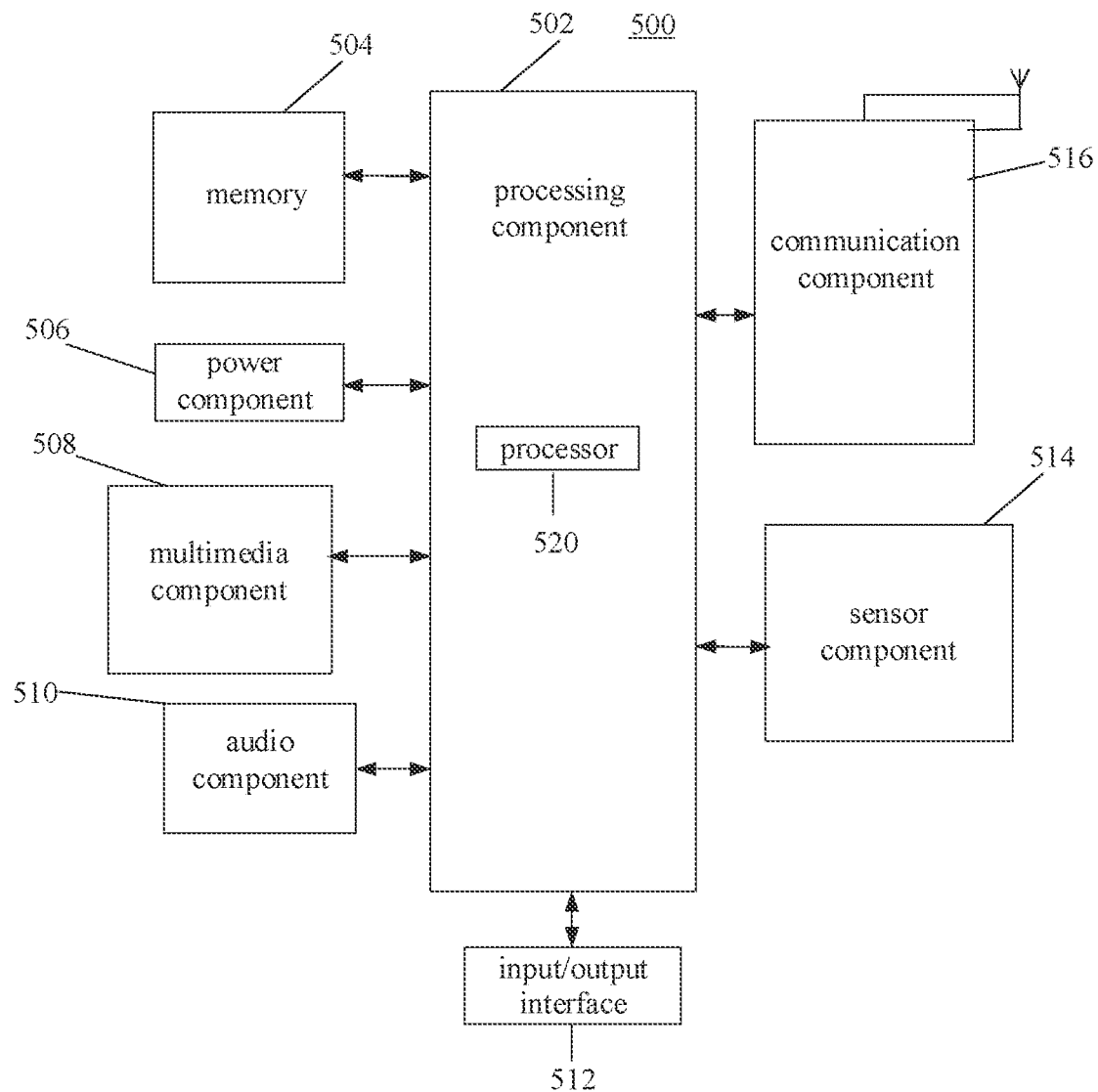
FIG. 5 is a block diagram of an electronic equipment for detecting a moving target according to an embodiment of the disclosure.

FIG. 5 illustrates an electronic equipment 500 for detecting a moving target according to an embodiment of the disclosure. The electronic equipment 500 may be a mobile phone, a computer, a digital broadcast terminal, a messaging device, a game console, a tablet device, a medical device, a fitness device, a personal digital assistant, and the like. The electronic equipment 500 may include one or more of the following components: a processing component 502, a memory 504, a power component 506, a multimedia component 508, an audio component 510, an input/output (I/O) interface 512, a sensor component 514, and a communication component 516.

The processing component 502 generally controls the overall operation of the electronic equipment 500, such as operations associated with display, telephone calls, data communications, camera operations, and recording operations. The processing component 502 may include one or more processors 520 to execute instructions to complete all or part of the steps of the above method. In addition, the processing component 502 may include one or more modules to facilitate interaction between the processing component 502 and other components. For example, the processing component 502 may include a multimedia module to facilitate interaction between the multimedia component 508 and the processing component 502.

The memory 504 is configured to store various types of data to support operations on the electronic equipment 500. Examples of these data include instructions for any application or method operated on the electronic equipment 500, contact data, phone book data, messages, pictures, videos, etc. The memory 504 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 506 provides power to various components of the electronic equipment 500. The power component 506 may include a power management system, one or more power supplies, and other components associated with power generation, management and distribution of the electronic equipment 500.

The multimedia component 508 includes a screen that provides an output interface between the electronic equipment 500 and a user. In some other embodiments, the screen may include a liquid crystal display (LCD) and a touch panel (TP). If the screen includes a touch panel, the screen may be set as a touch screen to receive input signals from the user. The touch panel includes one or more touch sensors to sense touch, slide, and gestures on the touch panel. The touch sensor may not only sense the boundary of the touch or slide action, but also detect the duration and pressure associated with the touch or slide action. In some other embodiments, the multimedia component 508 includes a front camera and/or a rear camera. When the electronic equipment 500 is in an operating mode, such as a shooting mode or a video mode, the front camera and/or the rear camera may receive external multimedia data. Each of the front camera and the rear camera can be a fixed optical lens system or has the focal length and optical zooming capability.

The audio component 510 is configured to output and/or input audio signals. For example, the audio component 510 includes a microphone (MIC) configured to receive external audio signals when the electronic equipment 500 is in an operation mode, such as a call mode, a recording mode, and a speech recognition mode. The received audio signals may be further stored in the memory 504 or transmitted via the communication component 516. In some other embodiments, the audio component 510 also includes a speaker for outputting an audio signal.

The I/O interface 512 provides an interface between the processing component 502 and a peripheral interface module which may be a keyboard, a click wheel, buttons, and the like. These buttons may include, but are not limited to, a home button, a volume button, a start button, and a lock button.

The sensor component 514 includes one or more sensors for providing state assessment in various aspects for the electronic equipment 500. For example, the sensor component 514 may detect an on/off state of the electronic equipment 500, and the relative positioning of the components, e.g., the components are the display and the keypad of the electronic equipment 500, the sensor component 514 may also detect changes in the position of the electronic equipment 500 or one of the components of the electronic equipment 500, the presence or absence of contact between the user and the electronic equipment 500, the orientation or acceleration/deceleration of the electronic equipment 500, and temperature changes of the electronic equipment 500. The sensor component 514 may include a proximity sensor configured to detect the presence of a nearby object in the absence of any physical contact. The sensor component 514 may also include a light sensor, such as a CMOS or a Charge-coupled Device (CCD) image sensor, for use in imaging applications. In some other embodiments, the sensor component 514 may also include an acceleration sensor, a gyro sensor, a magnetic sensor, a pressure sensor, or a temperature sensor, and the like.

The communication component 516 is configured to facilitate wired or wireless communication between the electronic equipment 500 and other devices. The electronic equipment 500 may access a wireless network based on a communication standard, such as WiFi, an operator network (such as 2G 3G 4G or 5G), or a combination thereof. In one exemplary embodiment, the communication component 516 receives broadcast signals or broadcast-related information from an external broadcast management system via a broadcast channel. In one exemplary embodiment, the communication component 416 also includes a near field communication (NFC) module to facilitate short range communication. For example, the NFC module can be implemented based on radio frequency identification (RFID) technology, infrared data association (IrDA) technology, ultra-wideband (UWB) technology, Bluetooth (BT) technology and other technologies.

In some embodiments, the electronic equipment 500 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements for performing the above method.

In some embodiments, a non-temporary computer-readable storage medium including instructions is also provided, such as a memory 504 including instructions. The above instructions may be executed by the processor 520 of the electronic equipment 500 to accomplish the above method. For example, the non-temporary computer readable storage media may be an ROM, a random access memory (RAM), a CD-ROM, a magnetic tape, a floppy disk, an optical data storage device, etc.

Figure 6:
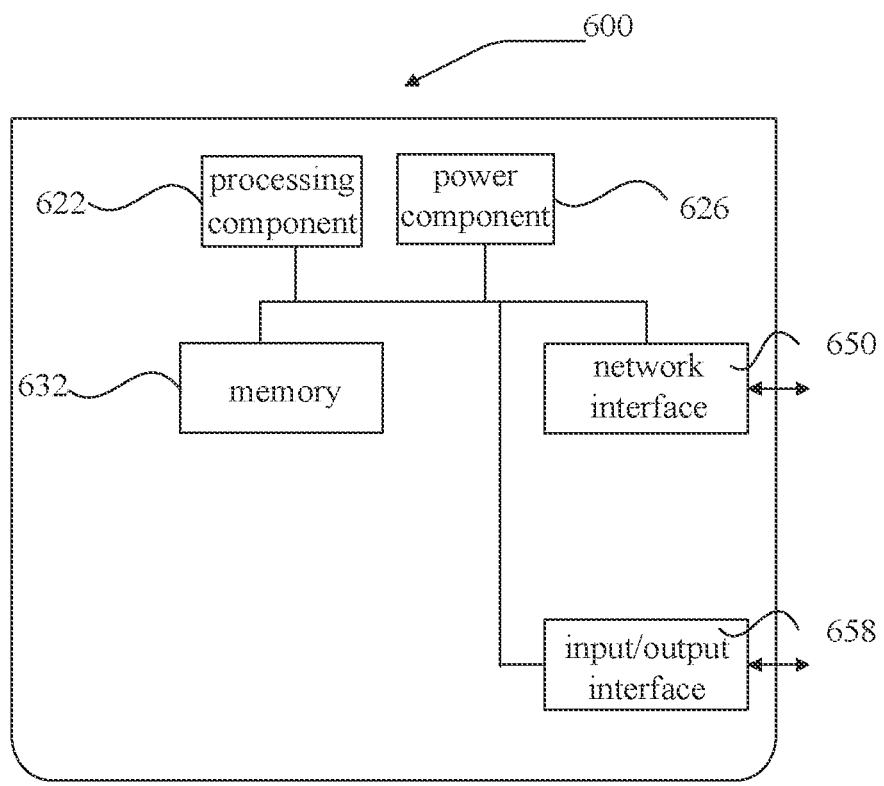
FIG. 6 is a block diagram of an apparatus for detecting a moving target according to an embodiment of the disclosure.

FIG. 6 illustrates an apparatus 600 for detecting a moving target according to an embodiment of the disclosure. For example, the apparatus 600 may be provided as a server or electronic equipment. As shown in FIG. 6, the apparatus 600 includes a processing component 622 which further includes one or more processors, and memory resources represented by a memory 632 for storing instructions, such as applications, that may be executed by the processing component 622. The application stored in the memory 632 may include one or more modules each corresponding to a set of instructions. In addition, the processing component 622 is configured to execute the instructions to perform the above detection method of the moving target.

The apparatus 600 may also include a power component 626 configured to perform power management of the apparatus 600, a wired or wireless network interface 650 configured to connect the apparatus 600 to the network, and an input/output (I/O) interface 658. The apparatus 600 may operate based on an operating system stored in the memory 632, such as Windows Server™, Mac OS X™, Unix™, Linux™, and FreeBSD™.

Some embodiments of the disclosure may also provide a computer program product that enables the server, the apparatus, or the electronic equipment to perform the above method for detecting the moving object when the instructions in the computer program product are executed by a processor of the server, the apparatus, or the electronic equipment.

Those skilled in the art easily think of other embodiments of the disclosure after considering the specification and practicing the invention disclosed herein. The disclosure is intended to cover any variations, uses, or adaptations of the disclosure, which follow the general principles of the disclosure and includes common sense or conventional technical means known in the art not disclosed in this disclosure. The specification and embodiments are exemplary only, and the true scope and spirit of the disclosure are indicated by the following claims.

It should be understood that the disclosure is not limited to the precise structure already described above and shown in the accompanying drawings, and various modifications and changes may be made without departing from its scope. The scope of the disclosure is limited only by the appended claims.

What is claimed is:

1. A method for detecting a moving target, comprising:
   obtaining a first frame image and a second frame image, and a rotation matrix and a translation matrix, wherein the first frame image and the second frame image are adjacent; the rotation matrix and the translation matrix are between the first frame image and the second frame image, the first frame image and the second frame image both comprise a same moving target;
   performing local contrast normalization on the first frame image and the second frame image;
   extracting a plurality of first feature points from the first frame image subjected to the local contrast normalization;
   extracting a plurality of second feature points, corresponding to the plurality of first feature points, from the second frame image subjected to the local contrast normalization based on an optical flow algorithm;
   determining a plurality of distances between the second feature points and a plurality of corresponding polar lines based on the rotation matrix and the translation matrix, wherein the plurality of corresponding polar lines are polar lines of the first feature points on the second frame image;
   determining a plurality of third feature points located on the moving target based on the distances; and
   detecting the moving target based on the third feature points.

2. The method for detecting the moving target according to claim 1,
   wherein said determining the distances comprises:
      determining the polar lines based on the rotation matrix and the translation matrix, and
      determining the distances between the second feature points and the polar lines based on coordinate values of the second feature points and the polar lines in the normalized camera coordinate system.

3. The method for detecting the moving target according to claim 1, wherein said determining the third feature points comprises:
   comparing the distances with a distance threshold respectively; and
   determining a part of the second feature points as the third feature points; wherein the part of the second features points correspond to distances greater than the distance threshold.

4. The method for detecting the moving target according to claim 1, wherein said detecting the moving target comprises:
   determining a minimum bounding rectangle as a moving target area; wherein the minimum bounding rectangle is formed by the third feature points; the moving target is in the moving target area.

5. The method for detecting the moving target according to claim 1, wherein said extracting the first feature points comprises:
   extracting the first feature points from the first frame image based on a FAST feature point detection algorithm.

6. An electronic equipment, comprising:
   a processor; and
   a memory for storing computer readable instructions;
   wherein the processor is configured to execute the computer readable instructions to implement followings:
      obtaining a first frame image and a second frame image, and a rotation matrix and a translation matrix, wherein the first frame image and the second frame image are adjacent; the rotation matrix and the translation matrix are between the first frame image and the second frame image, the first frame image and the second frame image both comprise a same moving target;
      performing local contrast normalization on the first frame image and the second frame image;
      extracting a plurality of first feature points from the first frame image subjected to the local contrast normalization;
      extracting a plurality of second feature points, corresponding to the plurality of first feature points, from the second frame image subjected to the local contrast normalization based on an optical flow algorithm;

determining a plurality of distances between the second feature points and a plurality of corresponding polar lines based on the rotation matrix and the translation matrix, wherein the plurality of corresponding polar lines are polar lines of the first feature points on the second frame image;

determining a plurality of third feature points located on the moving target based on the distances; and detecting the moving target based on the third feature points.

7. The electronic equipment according to claim 6, wherein said determining the distances comprises:

determining the polar lines based on the rotation matrix and the translation matrix, wherein the; and determining the distances between the second feature points and the polar lines based on coordinate values of the second feature points and the polar lines in the normalized camera coordinate system.

8. The electronic equipment according to claim 6, wherein said determining the third feature points comprises:

comparing the distances with a distance threshold respectively; and determining a part of the second feature points as the third feature points; wherein the part of the second features points correspond to distances greater than the distance threshold.

9. The electronic equipment according to claim 6, wherein said detecting the moving target comprises:

determining a minimum bounding rectangle as a moving target area; wherein the minimum bounding rectangle is formed by the third feature points; the moving target is in the moving target area.

10. The electronic equipment according to claim 6, wherein said extracting the first feature points comprises:

extracting the first feature points from the first frame image based on a FAST feature point detection algorithm.

11. A non-transitory computer-readable storage medium, comprising instructions, wherein in response to that the instructions are executed by a processor of a mobile terminal, the mobile terminal performs a process of:

obtaining a first frame image and a second frame image, and a rotation matrix and a translation matrix, wherein the first frame image and the second frame image are adjacent; the rotation matrix and the translation matrix are between the first frame image and the second frame image, the first frame image and the second frame image both comprise a same moving target;

performing local contrast normalization on the first frame image and the second frame image;

extracting a plurality of first feature points from the first frame image subjected to the local contrast normalization;

extracting a plurality of second feature points, corresponding to the plurality of first feature points, from the second frame image subjected to the local contrast normalization based on an optical flow algorithm;

determining a plurality of distances between the second feature points and a plurality of corresponding polar lines based on the rotation matrix and the translation matrix, wherein the plurality of corresponding polar lines are polar lines of the first feature points on the second frame image;

determining a plurality of third feature points located on the moving target based on the distances; and detecting the moving target based on the third feature points.

12. The non-transitory computer-readable storage medium according to claim 11, wherein said determining the distances comprises:

determining the polar lines based on the rotation matrix and the translation matrix, and determining the distances between the second feature points and the polar lines based on coordinate values of the second feature points and the polar lines in the normalized camera coordinate system.

13. The non-transitory computer-readable storage medium according to claim 11, wherein said determining the third feature points comprises:

comparing the distances with a distance threshold respectively; and determining a part of the second feature points as the third feature points; wherein the part of the second features points correspond to distances greater than the distance threshold.

14. The non-transitory computer-readable storage medium according to claim 11, wherein said detecting the moving target comprises:

determining a minimum bounding rectangle as a moving target area; wherein the minimum bounding rectangle is formed by the third feature points; the moving target is in the moving target area.

15. The non-transitory computer-readable storage medium according to claim 11, wherein said extracting the first feature points comprises:

extracting the first feature points from the first frame image based on a FAST feature point detection algorithm.

* * * * *